United States Patent [19]

Liu et al.

[11] Patent Number: 4,946,317

[45] Date of Patent: Aug. 7, 1990

[54] COAL LOG PIPELINE SYSTEM AND METHOD OF OPERATION

[75] Inventors: Henry Liu; Thomas R. Marrero, both of Columbia, Mo.

[73] Assignee: The Curators of the University of Missouri, Columbia, Mo.

[21] Appl. No.: 251,100

[22] Filed: Sep. 28, 1988

[51] Int. Cl.$^5$ .................................................. B65G 53/00
[52] U.S. Cl. .................................... 406/46; 406/197; 406/147
[58] Field of Search ................ 406/50, 82, 51, 86, 406/117, 147, 150, 168, 192, 197, 198, 20, 26, 27, 28, 148, 149, 171, 176, 85, 110, 108, 120

[56] References Cited

U.S. PATENT DOCUMENTS

| | | | |
|---|---|---|---|
| 1,503,365 | 7/1924 | Hoyt | 406/50 |
| 3,328,089 | 6/1967 | Hodgson et al. | 406/197 |
| 3,719,397 | 3/1973 | Wasp | 406/197 |
| 3,906,972 | 9/1975 | Jensen et al. | 406/197 |
| 4,049,392 | 9/1977 | Furman | 44/535 |
| 4,184,792 | 1/1980 | Turnbo | 406/51 |
| 4,286,935 | 9/1981 | Okuno et al. | 406/50 |
| 4,331,446 | 5/1982 | Draper et al. | 44/544 |
| 4,605,329 | 8/1986 | Duffy | 406/197 |

FOREIGN PATENT DOCUMENTS 760548 10/1956 United Kingdom .............. 406/120

OTHER PUBLICATIONS

Liu, Henry and Thomas Marrero, "Demonstration of CLF: An Advanced Technology . . .", *Federal Register*, vol. 51, No. 218, Wednesday, Nov. 12, 1986, pp. 1–14.

Liu, *A theory on Capsule Lift-Off in Pipelines*, Journal of Pipelines, 2 (1982), 22–23.

Liu and Rhee, *Behavior of Non-Uniform-Density Capsules*, HCP, Journal of Pipelines, 6 (1987–307–318).

Primary Examiner—Joseph F. Peters, Jr.
Assistant Examiner—Anne Sartelle
Attorney, Agent, or Firm—Litman, McMahon & Brown

[57] ABSTRACT

A method and apparatus for fabricating coal logs from crushed coal available at a mining site and for transporting coal logs through a pipeline to a combustion site for further coal processing and burning. The pipeline is operated to maintain the hydraulic carrier fluid flowing through the pipeline within a range of bulk velocities sufficient to force a layer of the hydraulic carrier fluid between contacting surfaces of each coal log and the pipeline, tending to lift and carry the coal log through the pipeline, and, thereby, significantly reduce the energy required to transfer the carrier fluid and the coal logs through the pipeline. The carrier fluid bulk velocity is also maintained sufficiently low to prevent unstable coal log flow behavior often resulting in coal log jamming and abasion. The range of optimum fluid bulk velocities is a function of various fluid and coal properties, the pipeline geometry and the coal log geometry.

19 Claims, 9 Drawing Sheets

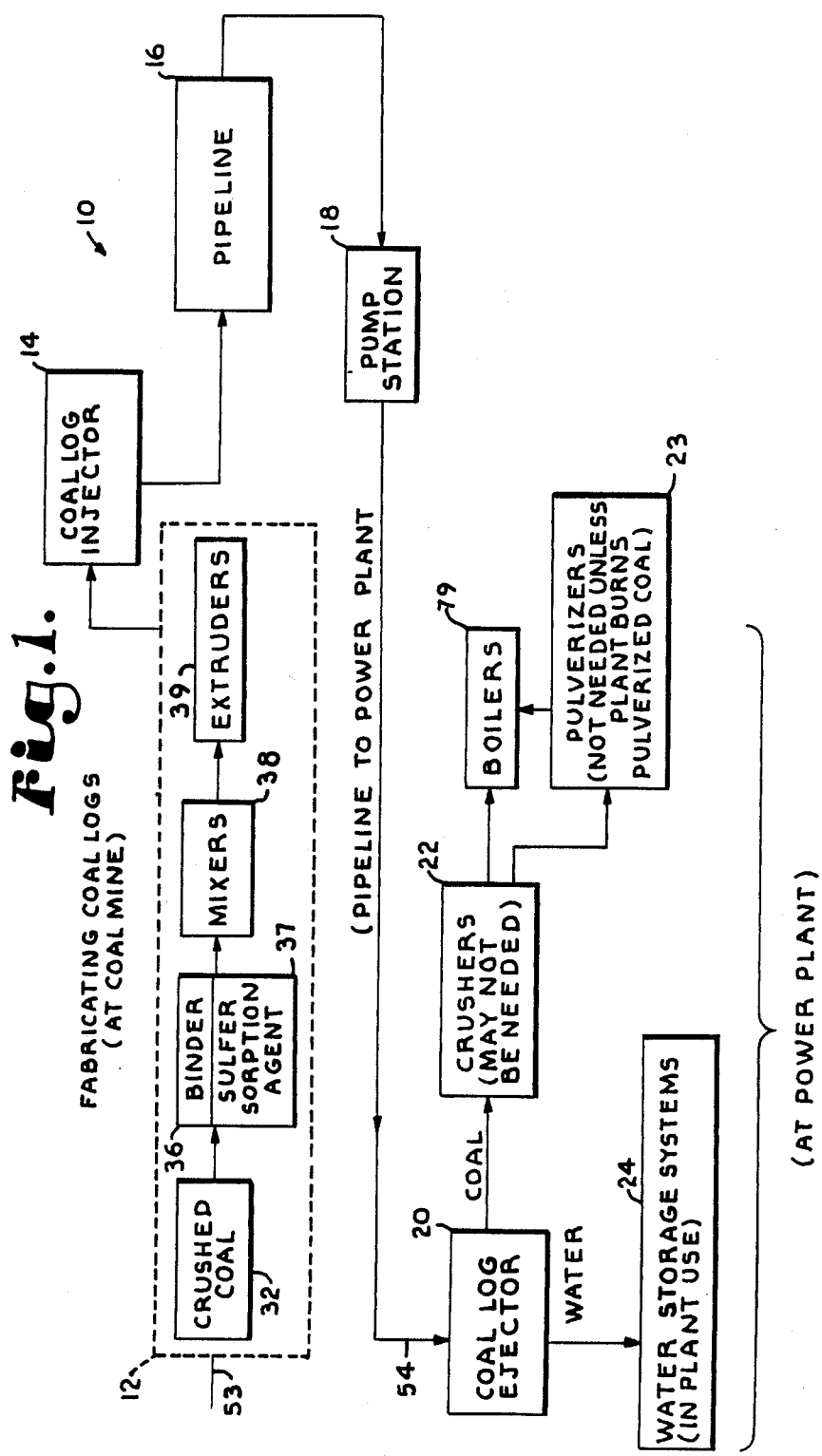

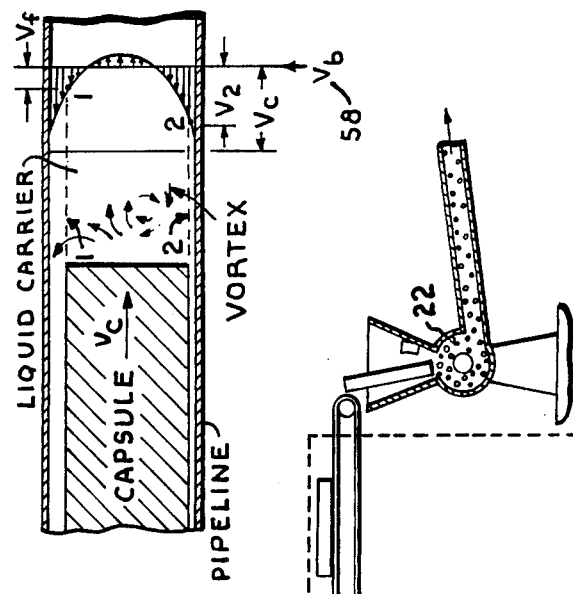
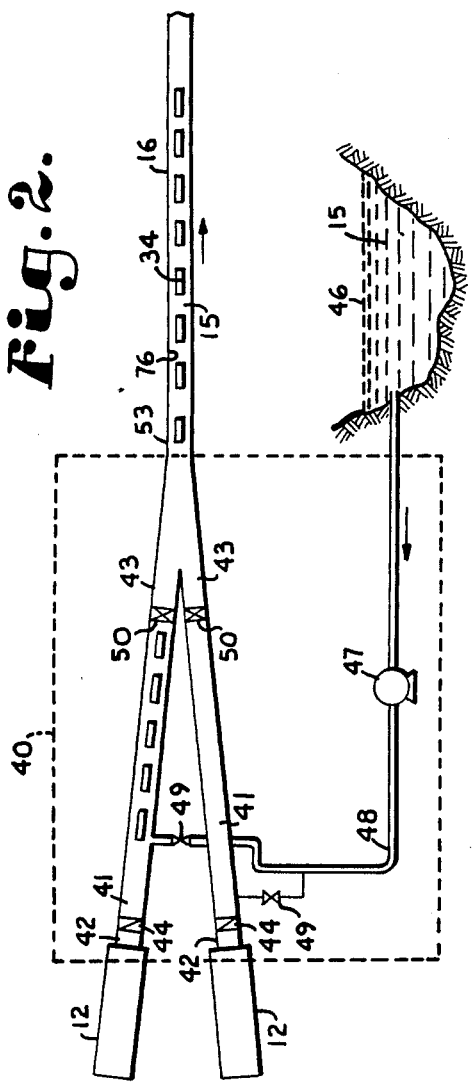
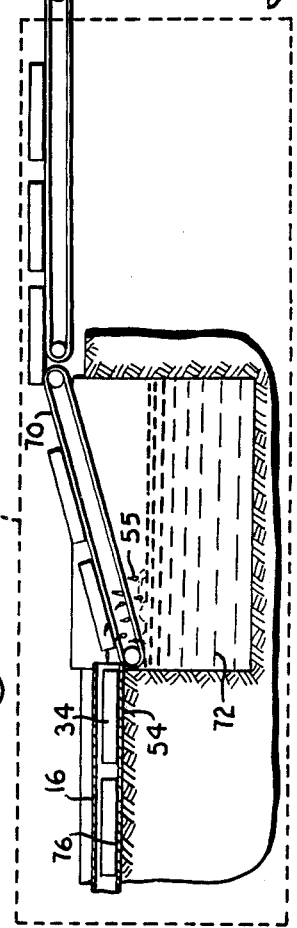

FORCES AND MOMENTS ON A STATIONARY CAPSULE

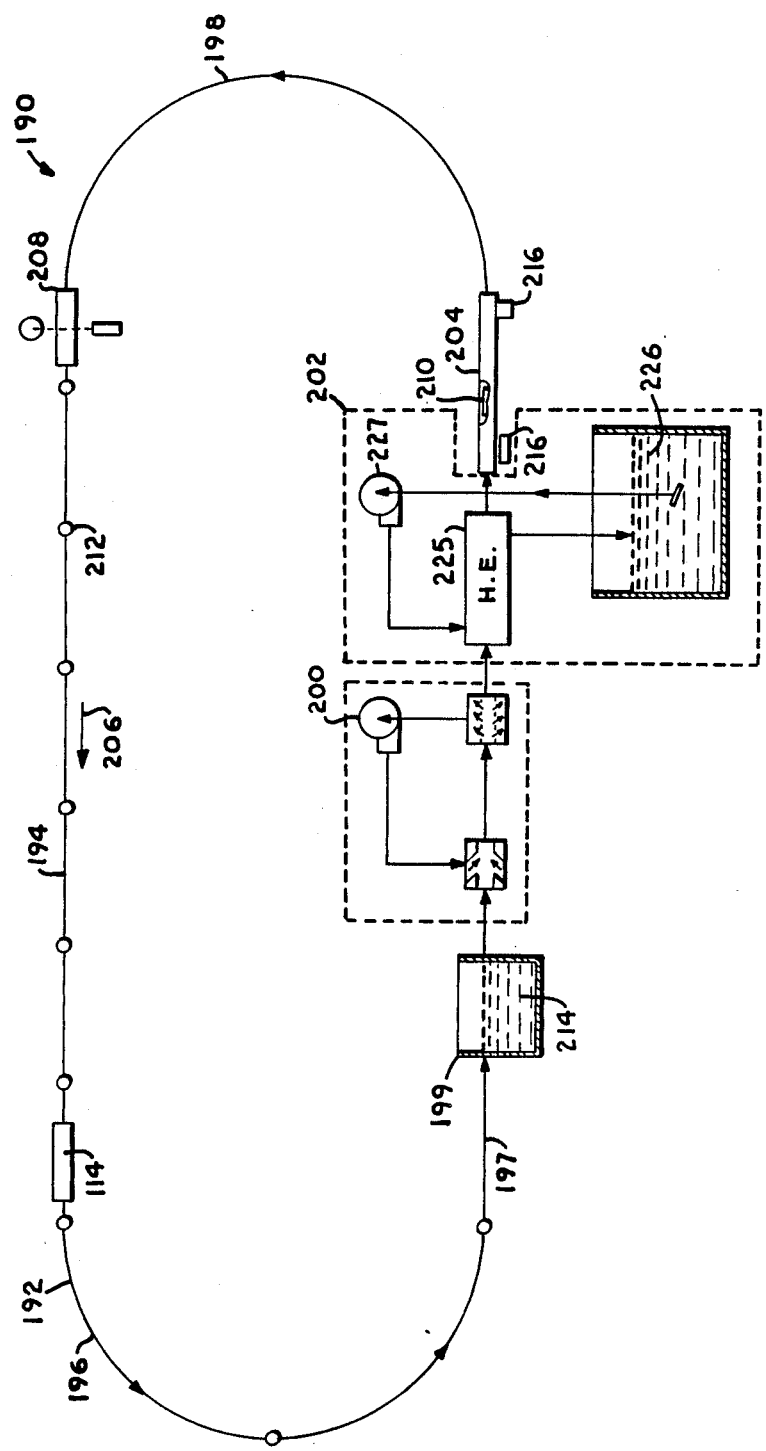

COAL LOG PIPELINE SYSTEM AND METHOD OF OPERATION

BACKGROUND OF THE INVENTION

1. Field of the Invention

This invention relates to a method and apparatus for hydraulically transferring coal in log or capsulized form, through a pipeline.

2. Description of the Prior Art

Processes for transferring coal in an aqueous slurry over long distances through pipelines have been in use for many years. One such process is set forth in U.S. Pat. No. 2,791,471. The '471 patent provides for a coal slurry transfer in batches, which batches are spaced apart by lower density fluid carriers, such as water. The batches are spaced apart because the quantity of coal which is transported through a pipeline generally is not sufficient to keep the pipeline full of coal slurry at all times. However, transporting coal in batches spaced apart by water resulted in plugging due to the inability of the low density water, acting as a hydraulic transportation media, to maintain in suspension heavier coal particles present in the slurry.

The plugging difficulties were lessened by use of principles such as those disclosed in the U.S. Pat. No. 2,920,923. A slug of liquid material was provided in the pipeline in advance of and following the main slurry slug. The slug of liquid material came to be known as a "pseudo fluid" and differed in composition and density from both the main slurry slug and the water carrier component of the slurry. In particular, the pseudo fluid density was less than that of the main slurry slug but greater than that of the water carrier. Because a fluid carrier's ability to maintain heavier coal particles in suspension is directly proportional to its fluid density, the pseudo fluid (having a density greater than that of the water carrier) was found to be an effective means to maintain the larger coal particles in suspension and, thus, reduce plugging in the pipelines. Use of the pseudo fluid in front of and behind of the main slurry slug provided a more dynamically stable slurry in the pipeline.

However, creation of the pseudo fluid having the desired properties involved a costly process of fabricating a range of coal particles with certain size distribution, for mixing with water. Further, since effective and economic use of such pseudo fluids required their re-use with numerous main slurry slugs, special handling systems were required, including storage facilities and associated pumps and piping to store the pseudo fluid when not in use. Further, pseudo fluids were not 100% effective at maintaining larger coal particles in suspension and, thus, the plugging problem was not totally resolved.

Other problems arose where a single pipeline furnished coal in batches to several plants along the pipeline. In order to provide a portion of the coal slurry to a particular plant, it was often necessary to remove all of the coal slurry from the pipeline to stabilize pipeline operations and to balance different flow rates in each section of the pipeline. Such a process called for the reformation of the pseudo fluid in front of and behind each batch (called the cap and tail, respectively) whenever the remaining coal slurry batches were returned to the pipeline for movement to the next downstream delivery point. The requirements of reforming the cap and tail increased the cost of the commercial coal slurry pipeline process.

Other disadvantages associated with commercial coal slurry pipeline processes include high costs associated with: (1) pulverization of coal necessary for slurry operation; (2) high liquid carrier to coal mass ratio for effective transfer; and (3) coal dewatering and drying processes required prior to use of coal after transfer. Further, coal slurries do not readily restart after stopping the carrier motion because after larger coal particles settle out of the liquid carrier and come to rest on the pipe floor under static conditions, they are not readily returned into suspension in the restarted carrier from their resting position. Finally, coal slurries are highly abrasive to pipelines, especially in pipeline bends.

Other procedures have heretofore been proposed for transporting materials, such as coal, through pipelines which are improvements over the disadvantages referenced above. Such procedures have included material transfer by use of rigid-walled containers into which are inserted materials to be transported. The containers are hydraulically moved through the pipeline. Such procedures, however, suffer many disadvantages including those associated with container manufacturing costs and difficulties associated with container handling. Disclosed in the Hodgson et al. U.S. Pat. No. 3,333,901 is a method and apparatus which sought to overcome these difficulties by providing a process for the fabrication of the substances to be transported into coherent shapes, bodies or packages prior to insertion in the pipeline. While the Hodgson '901 reference states that each particular material may be packaged in a manner best suited for the most efficient transportation thereof, and offers some guidance regarding ranges of the ratio of package density to the density of the fluid carrier (e.g. (10.0–1.0) to (7–1)), the '901 reference does not teach nor suggest the dynamic operating parameters necessary for the cost effective operation of a pipeline carrying coal capsules having a cylindrical shape. The method disclosed in the '901 reference for transporting coal shaped into cylindrical packages could cause excessive energy consumption and damage both the coal package and the interior surfaces of the pipeline.

Heretofore, there has not been available a coal pipeline material transport process or apparatus with the advantages and features of the present invention.

SUMMARY OF THE INVENTION

In the practice of the present invention, crushed coal available at a coal mining site is fabricated into coal capsules or logs having an outside diameter less than that of an inner diameter of a pipeline through which the coal logs will be transported to a distant location. The coal logs have generally uniform shape and density. The coal logs are fabricated using a commercial extrusion process suitable for extruding crushed coal. Coal logs are also fabricated according to a method which forms them into generally cylindrical shapes which are less likely to flow through the pipeline in a tilted orientation often resulting in either coal log jamming within the pipeline or coal log damage.

The extrusion process is provided with a means for the addition of additives to the crushed coal such as coal binders and sulfur sorption agents. Coal binders may be added to the crushed coal, which binders possess coal particle adhesion qualities and which operate to bind the crushed coal particles together and maintain the generally cylindrical coal log shape formed by the extrusion process. The particular binders used in the practice of the present invention function to maintain the shape of the coal log throughout the transport process.

Sulfur sorption agents, during coal combustion, operate to capture, in varying degrees, sulfur compounds present in the crushed coal. The sulfur compounds pose environmental threats if released to the atmosphere in an effluent combustion by-product stream of a coal combustion process. The introduction of sulfur sorption agents into the crushed coal increases the value of coal having a high sulfur content. Sulfur sorption agents include such materials as crushed limestone, hydrated lime and dolomite.

Once fabricated, the coal logs are injected into the pipeline by a launcher tube apparatus. The launcher tube apparatus comprises a plurality of launcher tubes each of which receive fabricated coal logs from individual extruders and can be operated to inject the coal logs into the pipeline system. A plurality of launcher tubes are included to provide the continuous injection of coal logs by alternately loading coal logs into one launcher tube while injecting the loaded logs already present in another launcher tube into the pipeline. A pump supplies a flow of water to each launcher tube which provides the driving force to eject the coal logs from each launcher tube at the appropriate time. Each launcher tube is provided with a check valve to prevent back flow and full-bore bore valves which allow the passage of coal logs through the valve body when the valve is open. The full-bore valves isolate the launcher tube from the pipeline when the full bore valve is shut.

Once in the pipeline the coal logs are carried to a distant location by a water carrier, the bulk velocity of which is maintained in an optimum operating range for substantially suspending each coal log within the carrier to reduced headloss and abrasion coal logs and to internal surfaces of the pipeline.

Once the coal logs have been carried through the pipeline by the carrier to their destination, the coal logs are forced out of the outlet of the pipeline by the water carrier and fall onto the surface of a conveyor system for delivery either to a coal log crusher or directly to a coal combustion unit or other coal processing unit. The water carrier, issuing from the outlet of the pipeline as the coal logs are ejected onto the conveyor system, is collected in a reservoir which stores the water carrier for reuse or disposal. The reservoir also collects water draining off the coal logs immediately after the coal logs are ejected onto the conveyor system.

OBJECTS AND ADVANTAGES OF THE INVENTION

The principal objects and advantages of the present are: to provide an improved coal pipeline method and apparatus for facilitating the cost effective, energy efficient transportation of coal from a coal mine to the ultimate destination; to provide such a method and apparatus which creates coal logs having desirable hydrodynamic properties; to provide such a method of operation of the pipeline which maintains the coal logs substantially suspended in the moving liquid carrier, thus reducing headloss and abrasive damage to both the interior surface of the pipeline and the coal logs during transportation; to provide such a method and apparatus which allows the fabrication of coal logs with additives including coal log binders and sulfur sorption agents; to provide a method and apparatus which transports coal through a pipeline using substantially less water carrier than that required for coal slurry transfer; to provide such a method and apparatus which does not require expensive coal log dewatering and drying systems; to provide such a method and apparatus which does not require coal grinding or pulverization of coal for coal log fabrication; and to provide a pipeline which may be economically buried beneath ground level because of its relatively small diameter.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a schematic illustration of the improved coal log pipeline transportation system.

FIG. 2 is a diagrammatic elevation of a pipeline launcher tube means showing coal logs disposed therein.

FIG. 3 is a diagrammatic elevation of the ejector apparatus for ejecting coal logs from a pipeline and delivering them to a coal crusher.

FIG. 4 is a sectional elevation of a portion of a pipeline with a capsule disposed therein illustrating the theoretical lift on the face of a capsule carried through a pipeline by a fluid carrier.

FIG. 9 is a diagrammatic elevation of an experimental coal log pipeline.

FIG. 17 is the theoretical relationship between the temperature at which coal possessing various sulfur sorption agents is combusted and the sulfur removal rate.

DETAILED DESCRIPTION OF THE INVENTION

Figure 6:
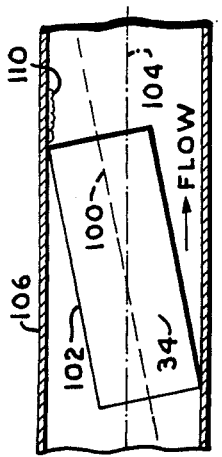
FIG. 6 is a sectional elevation of a portion of a pipeline with a capsule disposed in an unstable orientation therein.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, the numeral 10 generally designates a coal log pipeline system. The coal log pipeline system 10 comprises a coal log fabrication unit 12, a coal log injection means 14, a water carrier 15, a pipeline 16, a pump station 18, and a coal log ejection means 20. Coal log crushers 22, coal pulverizers 23, and water storage systems 24 are optional features.

The coal log fabrication unit 12, in the present embodiment, may be located near a coal mine. The coal is crushed to crushed coal 32 a predetermined size for fabrication of coal logs 34 which are transported through the pipeline 16.

Fabrication of coal logs 34 may include the addition of a binder 36 to the crushed coal 32 prior to formation of the coal logs 34. The binder 36 may be added to the coal logs 34 to enhance the resistance of the coal log 34 to external damaging forces acting on the coal logs during transportation through the coal log pipeline system 10. The binder 36 may be any water-insoluble, economical, combustible and non-toxic material which possesses a coal binding property. The binder 36 may be in any practical form, including liquid, granular, or fibrous.

It is also foreseen that the coal logs 34 may be fabricated in a binderless process. Such a binderless process may, for example, involve the heating of the outer surface of the coal log 34, by use of microwaves, to form an outer crust surrounding the coal log 34. Another binderless process involves the addition of solvents, such as acetone, to the coal log 34 to extract and concentrate low molecular weight hydrocarbons present in the coal log 34 which possess binder properties. After the solvent is evaporated, the remaining concentrated low molecular weight hydrocarbons operate to bind the crushed coal 32 in the shape of coal logs 34.

A sulfur sorption agent 37 may also be added to the crushed coal 32 in the fabrication of the coal logs 34. The sulfur sorption agent 37 may be any material which operates to desulfurize the effluent coal combustion gasses by capturing sulfur during the combustion of coal log 34 containing sulfur compounds. Suitable sulfur sorption agents 37 include limestone, hydrated lime, and dolomite, or combinations and mixtures thereof.

Once the desired binder 36 and sulfur sorption agent 37 are added to the crushed coal 32, coal logs 34 are fabricated by forcing the materials through a mixer 38 and through an extruder 39. The mixer means 38 and extruder means 39 may be one of many types which are commercially available for such uses. It is also foreseen that fabrication of coal logs 34 may be accomplished by other agglomeration processes such as roll compaction and impact pelletizing.

The coal logs 34 are fabricated generally into cylindrical shapes because such shapes are found to possess superior qualities for flow through a pipeline system 10. Fabrication of cylindrical shapes increases the amount of coal which can be transferred through a pipeline at any one time since a volume of pipeline can be virtually filled by cylindrical shaped objects. Further, the forces of the water carrier 15 will be applied evenly to face 35 of each coal log 34, thus, minimizing damage often resulting from the application of forces to an uneven coal surface. It is also foreseen that the outer edges associated with the faces 35 of the coal logs 34 may be slightly rounded to lessen the abrasion of the coal log 34 as it it carried through the pipeline 16. Finally, it is foreseen that the coal logs may be coated with a friction reduction agent, such as a metal salt of zinc stearate, graphite or the like.

The coal log injector 14 comprises any suitable process for the injection of the coal logs 34 into the pipeline 16. In the present embodiment, the injection of coal logs 34 by the coal log injector 14 comprises direct extrusion of the coal log 34 into a launcher tube apparatus 40, such as that illustrated in FIG. 2. The log launcher apparatus 40 comprises a plurality of launcher tubes 41 each having an first end 42 and a second end 43. Positioned adjacent to and in flow communication with each first end 42 of each launcher tube 41 is an individual coal log fabrication unit 12. A check valve 44 is positioned in the proximity of the first end 42 of each launcher tube 41 to prevent backflow from the pipeline 16 through the launcher apparatus 40 and coal log fabrication unit 12.

A water carrier 15 is supplied from a reservoir 46 by a pump 47 through a supply header 48 to each launcher tube 41 at a location between the check valve 44 and the second end 43. It is also foreseen that other fluid carriers may be used for their desired properties and availability, such as brine, brackish water, and the like. The supply header 48 is provided with isolation valves 49 to supply or block flow of water 15 to the launcher tubes 41, as desired.

Located in the proximity of the second end 43 of each launcher tube 41 is a full-bore valve 50 of a design which allows passage of the coal logs 34 through the full-bore valve 50 when it is opened. The second end 43 of each launcher tube 41 is fixedly attached to and in flow communication with the pipeline 16. In operation, coal logs 34 are alternately fed into and emptied from individual launcher tubes 41 by alternately opening and closing the isolation valves 49 and the full-bore valves 50 with the pump 47 in operation.

It is also foreseen that coal logs 34 may be first fabricated, then injected into the pipeline 16 by using either longitudinal or lateral injection methods such as those disclosed in the Liu U.S. Pat. No. 4,334,806.

The pipeline 16 has a substantially uniform internal diameter, a mining site end 53 and a coal consumption end 54. It is also foreseen that the pipeline 16 may have numerous coal consumption ends 54 to supply coal to different consumers along the distance of the pipeline 16. The pump 47 pumps water 15 at a bulk velocity which maintains the coal logs 34 generally uniformly suspended in the water 15 as it is pumped through the pipeline 16.

At intervals along the pipeline 16, additional pump stations 18 are provided to maintain the desired bulk velocity of the water 15 in its optimum operating range.

Once the coal log 34 has been carried by the water 15 through the coal pipeline 16, the coal logs 34 are removed from the coal pipeline means 16 by a coal log ejector 20 which is located near and in flow communication with each coal consumption end 54 of the pipeline 16. FIG. 3 shows an embodiment of the ejection means 20 which includes a conveyor system 70 for conveying the coal logs 34 to a crusher 22. As the coal logs 34 and exiting water 55 emerge from the consumption site end 54 of the pipeline 16, the coal logs 34 fall onto the conveyor system 70. The water 55 flows over the conveyor system 70 and is collected in a reservoir 72 for reuse or disposal. The conveyor means 70 comprises any commercially suitable conveyor used in coal transporation applications. The conveyor means 70 transports the coal logs 34 from the coal consumption end 54 to a crusher 22. The crusher 22 can be of any suitable design for crushing coal to a size suitable for combustion in a boiler 79. It is also foreseen that coal logs 34 may be fed directly to a combustion process.

The pipeline 16 is operated with the bulk velocity 58 of the water 15 maintained within a certain optimum operating range to minimize headloss of the water 15 carrying the coal logs 34 through the pipeline 16 and also to minimize abrasion of the coal logs 34 and the interior surface 76 of the pipeline 16. It is theorized that when cylindrical, uniform density coal logs 34 are carried through a pipeline by a liquid, headloss and abrasion experienced are a function of the ability of the water 15 to lift and suspend the cylindrical coal logs 34.

The lift on coal logs 34 carried by water 15 through a pipeline 16 can be described by the principles explained in Liu, *A Theory on Capsule Lift-Off in Pipeline*, Journal of Pipelines, 2 (1982), 23–33. Lui considers a heavier-than-water capsule in a horizontal pipe filled with water, with both the capsule and the water initially at rest. As the water starts to move, the capsule remains stationary when the water bulk velocity is small. At an incipient or threshold minimum water bulk velocity, sufficient force is developed against the capsule to overcome the static friction between the capsule and the pipeline. When this incipient or threshhold velocity is reached, the capsule starts to move with a relatively thin layer of water trapped in the clearance developed between any roughness elements of the pipeline interior surfaces and the contacting surfaces of the capsule. Roughness elements refer to any form of roughness present on the interior surface of the pipeline, and include, welded seams, pipeline bends, obstructions, and the like. Resistance to capsule motion, is, at the threshold velocity, essentially the sliding friction between two contacting surfaces. The resistance to capsule motion is a combination of the laminar-flow shear and reduced contact friction between the pipeline interior surface and the capsule contacting surfaces. This state is referred to as "micro-lift". Liddle, *A Photographic Study of Capsule Behavior In Pipelines*, M.S. Thesis, University of Alberta, Edmonton, Canada, 1968, Page 226. The condition of micro-lift, as well as the theoretical relationship between the fluid carrier bulk velocity, $V_b$, and between the pipeline interior surface and the capsule contacting surface, is illustrated in FIG. 7.

Figure 7:
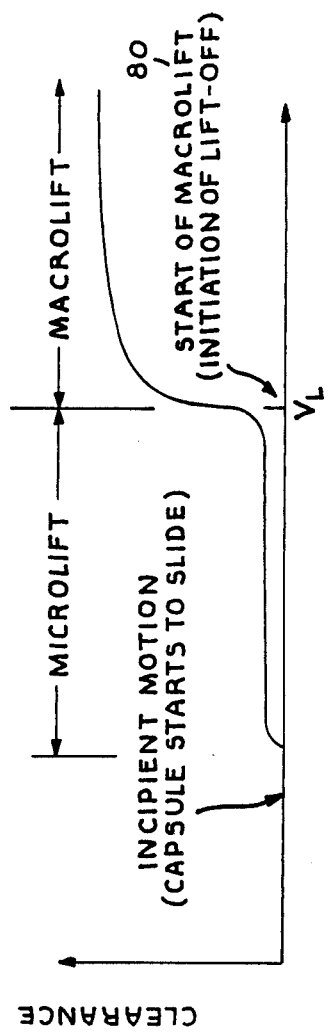
FIG. 7 is the theoretical relationship between the bulk velocity of a carrier fluid versus the clearance between the walls of a capsule in the interior surface of a pipeline.

As the bulk velocity of the fluid carrier is further increased, a state of "macro-lift" will eventually emerge, shown in FIG. 7, in which a relatively large clearance between the capsule and the pipeline interior develops. In a condition of macro-lift, the capsule moves through the pipe essentially without touching the pipe interior wall. The capsules in this state are suspended.

The theoretical lift forces operating on a capsule forced through a pipeline by a liquid carrier are illustrated in FIG. 4. The capsule is carried by liquid through the pipeline at a capsule velocity, $V_c$. The fluid velocity, $V_f$, relative to the capsule at a small distance in front of the capsule is represented by the area marked by straight arrows, each of which extend from a line representing bulk velocity, $V_b$. Note that $V_f$ near the pipeline wall is less than $V_b$ and is greater than $V_b$ in the center of the pipeline. Because a point 1 corresponding to a upper clearance, is much closer to pipe wall than a point 2, corresponding to a lower clearance, the relative velocity at point 2 is much greater than the relative velocity at point 1. From the Bernoulli equation for incompressible flow, such a disparity between the fluid velocities at points 1 and 2 creates a higher stagnation pressure near point 2 on the front face of the capsule. The higher pressure creates a clockwise vortex in front of the capsule. The vortex builds up pressure under the capsule near the front edge of the capsule and produces an upward shear force on the face which helps to lift the capsule and to cause a nose-up orientation. The build-up of pressure under the front edge of the capsule produces even a greater lift and nose-up orientation. This theory explains how lift is generated on capsules and why capsules usually move in a nose-up position.

Liu has determined that the liftoff velocity $V_1$ 80 necessary to achieve a capsule macro-lift condition is represented by the equation:

$V_1 = C((|S-1|gak(1-k^2)D)^{**\frac{1}{2}}$: wherein:

$V_1$ = liftoff velocity 80

C = a constant which is a function of the eccentricity and geometry of the capsule and (7.2 for uniform density capsules);

S = capsule specific gravity;

g = acceleration of gravity;

a = longitudinal length of the capsule divided by the its diameter;

k = the ratio of the diameter of the capsule to the inner diameter of the pipeline; and D = the inner diameter of the pipeline.

C = 7.2 for uniform density capsules.

The equation describing $V_1$ to achieve capsule macro-lift is expected to hold at least approximately within the range of $1.01 < S < 1.05$, $0.7 < k < 0.9$, and $2.5 < a < 6.5$. Further, note that C in the above equation is only given for uniform density capsules.

In commercial applications, however, a certain degree of non-uniform density in the fabrication of the capsules is unavoidable. Non-uniform density capsules behave differently than uniform density capsules and often exhibit unstable behavior the effect of the non-uniform density on the flow characteristics of the capsule in the liquid carrier must be taken into consideration and is discussed in: Liu and Rhee, *Behavior of Non-Uniform Density Capsules in HCP*, Journal of Pipelines, 6 (1987) 307–318.

It is theorized by Liu and Rhee that a non-uniform density capsule will display unstable flow characteristics which will depend on the geometry, the buoyancy, and the weight of the capsule in the flow medium and will further depend on the pipe geometry. In addition, a drag force and a hydrodynamic lift force generated when the capsules are moving in a pipeline will also play a role in the stability of the capsules.

Figure 5:
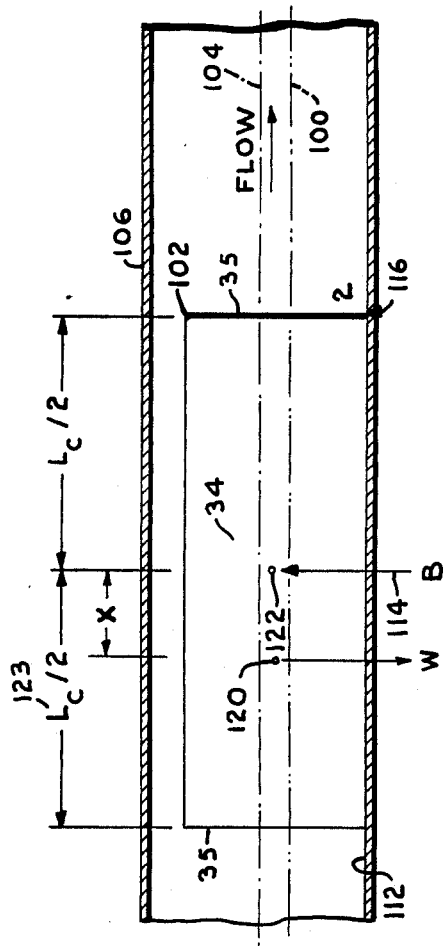
FIG. 5 is a sectional elevation of a portion of a pipeline with a capsule disposed therein illustrating the theoretical effect of a capsule's geometric eccentricity on the stability of the capsule as it is transported through a pipeline by a fluid carrier.

Referring to FIGS. 5 and 6, a condition of instability exists whenever the longitudinal axis 100 of a non-uniform density capsule 102 falls out of parallel with the longitudinal axis 104 of the pipeline 106. In this condition there is a danger that unstable capsules 102 will jam in the pipeline 106 when the capsule 102 in the tilted condition encounters a large roughness element 110 within the pipeline 106, such as those which are normally associated with pipe joints or welds or the like.

Referring to FIG. 5, under static conditions, the heavier-than-water capsule will remain in a horizontal resting position on the pipe bottom 112 so long as the clockwise overturning moment generated by the buoyant force 114, B, about the rear-end point 116, is smaller than the counterclockwise stabilizing moment about rear end point 116 generated by the weight 118, W, of the capsule 102. In particular, stability prevails when:

$$B(L_c/2) < W((L_c/2) - x).$$

Further, the non-uniformity of the capsule density in the longitudinal direction can be characterized by:

$$E = 2x/L_c$$

where:
E = eccentricity
x = distance between center of gravity, 120, and the centroid 122 (i.e., the geometric center);
$L_c$ = longitudinal length 123 of the capsule;
B = buoyancy 114, B;
W = capsule weight 118, W;
Combining the above equations results in:
E < 1 − B/W (stable capsule);
E > 1 − B/W (unstable capsule).

Note that in the foregoing equations, the ratio of B/W is the same as 1/S where S is the specific gravity S of the capsule.

Whenever a heavier-than-water capsule is stable, it rests horizontally on the pipe bottom regardless of whether it is front-heavy or rear-heavy. Conversely, a lighter-than-water coal log rests against the top of the pipe in a horizontal position. When a rear-heavy coal log is unstable, no matter whether the capsule is lighter-than-water, the capsule tilts upward and touches the top of the pipe with the rear of the coal log touching the pipe bottom. The opposite orientation occurs for unstable front-heavy capsules.

Table 1 illustrates the stable and unstable orientations of the coal logs which are heavier and lighter than water and which are rear heavy and front heavy.

TABLE 1

Static stability characteristics of heavier-than-water capsule

| Capsule type Specific gravity | Eccentricity | Stability classification | Stability criterion | Equilibrium position of capsule |
|---|---|---|---|---|
| S > 1 Heavier-than-water capsule | X0<br>1 > E > 0<br>Rear heavy | Stable | $E < 1 - \frac{1}{S}$ | Resting horizontally on pipe bottom |
|  |  | Unstable | $E > 1 - \frac{1}{S}$ | Front end tilts up |
|  | X < 0<br>1 > E > −1<br>Front heavy | Stable | $E > \frac{1}{S} - 1$ | Resting horizontally on pipe bottom |
|  |  | Unstable | $E < \frac{1}{S} - 1$ | Rear end tilts up |
| S < 1 Lighter-than-water capsule | X > 0<br>1 > E > 0<br>Rear heavy | Stable | $E < \frac{1}{S} - 1$ | Resting horizontally on pipe top |

TABLE 1-continued

Static stability characteristics of heavier-than-water capsule

| Capsule type Specific gravity | Eccentricity | Stability classification | Stability criterion | Equilibrium position of capsule |
|---|---|---|---|---|
| | | Unstable | $E > \frac{1}{S} - 1$ | Rear end tilts down |
| | $X < 0$ $1 > E > -1$ Front heavy | Stable | $E > 1 - \frac{1}{S}$ | Resting horizontally on pipe top |
| | | Unstable | $E < 1 - \frac{1}{S}$ | Front end tilts down |

The above criteria also can be rewritten as:
$I = |E|/|1-(1/S)|$
I = Static Stability Index.
I < 1 for all stable capsules and I > 1 for all unstable capsules.

Although the foregoing analysis is valid for only static conditions, experiment has shown that the static stability index I may also be used to predict at what bulk velocity, $V_b$, a statically stable capsule becomes dynamically unstable within the pipeline.

Table 2 lists experimental results illustrating the effect of varying physical properties of capsules (coal or any other material) on the stability of the capsule. Only heavier-than-water capsules were tested. The yaw angle identified in Table 2 is a maximum angle that a capsule can tilt in a pipe of a given diameter, and the "maximum gap" refers to the maximum gap between the capsule and the pipe which a capsule can have corresponding to the yaw angle.

from capsule No. 1, and is representative of the data collected for each of the twelve capsule tested over the flow ranges.

Figure 8B:
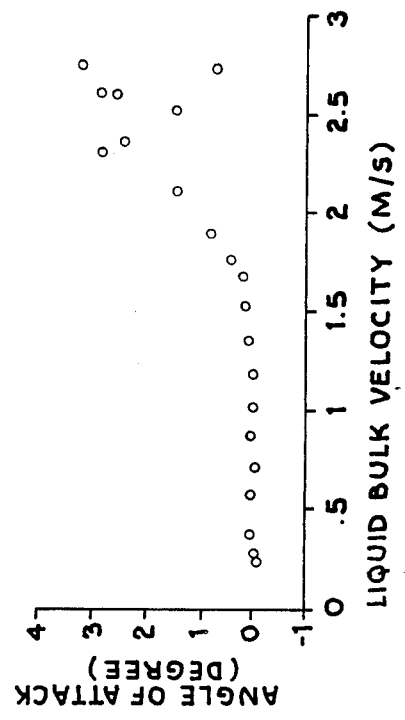
FIG. 8 is the theoretical relationship between carrier bulk velocity and the lower gap, angle of attack, and capsule velocity of a coal log flowing through a pipeline.
Figure 8A:
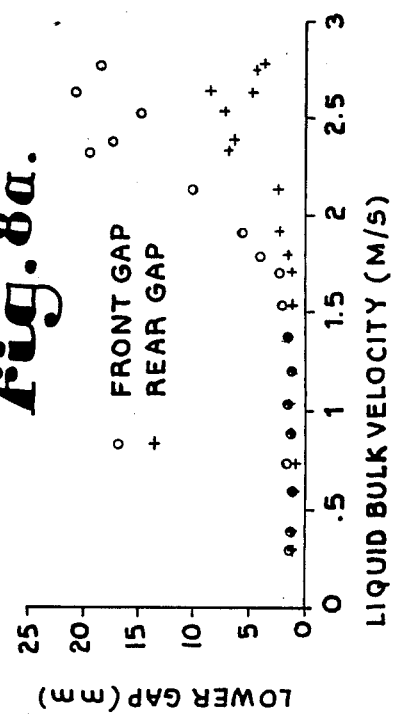

Parts (a), (b) and (c) of FIG. 8 give respectively, the variations of gaps, angle of attack and the capsule velocity with the fluid bulk velocity. Referring to FIG. 8(a), the capsule gaps, especially the front gap, increase rapidly when the flow velocity exceeds 1.7 m/s. This marks the condition of macro-lift and, thus, identifies the liftoff velocity 80, $V_1$. The same liftoff velocity 80, $V_1$, can be found from FIG. 8(b). Note that the angle of attack of the capsule increased rapidly after liftoff velocity 80, $V_1$, had been exceeded, and it rapidly approached the yaw angle when the velocity rose to approximately 2.5 m/s. This indicates that while it is desirable to maintain the fluid flow velocity at or slightly above the liftoff velocity 80, $V_1$, further increases of fluid velocity move the capsule into an unstable condition.

TABLE 2

Physical properties of capsules in pipe

| Capsule no. | Aspect ratio $A = L_c/D_c$ | Diameter ratio $k = D_c/D$ | Specific gravity $S = \rho_c/\rho$ | Eccentricity $E = 2x/L_c$ | Stability index $I = \dfrac{E}{1 - \dfrac{1}{S}}$ | Stable (S) or Unstable (U) | Yaw angle (degree) | Maximum gap (mm) |
|---|---|---|---|---|---|---|---|---|
| 1 | 2 | 0.867 | 1.077 | 0 | 0 | S | 4.4 | 25 |
| 2 | | | | +0.024 | 0.34 | S | | |
| 3 | | | | −0.024 | 0.34 | S | | |
| 4 | 2 | 0.933 | 1.165 | 0 | 0 | S | 2.0 | 12 |
| 5 | | | | +0.009 | 0.64 | S | | |
| 6 | | | | −0.009 | 0.64 | S | | |
| 7 | 4 | 0.867 | 1.056 | 0 | 0 | S | 2.2 | 25 |
| 8 | | | | +0.019 | 0.36 | S | | |
| 9 | | | | −0.019 | 0.36 | S | | |
| 10 | 4 | 0.933 | 1.030 | 0 | 0 | S | 1.0 | 12 |
| 11 | | | | +0.039 | 0.36 | U | | |
| 12 | | | | −0.039 | 0.36 | U | | |

Each of the twelve capsules was tested at approximately twenty different mean flow velocities, ranging from 0.2 to 2.8 meters per second (m/s). For each velocity, the gap between the capsule bottom and the pipe bottom was measured both at the capsule front (front gap) and the capsule rear (rear gap).

Figure 8C:
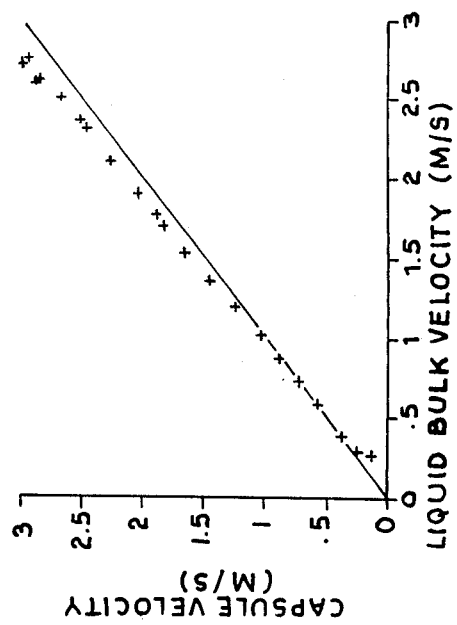

Also measured for each run were capsule angle of attack and capsule velocity. FIG. 8 shows the results Further, from FIG. 8(c) for capsule No. 1, at bulk velocities, $V_1$, lower than 0.5 m/s, the capsule velocity was lower than the fluid velocity. This suggests that at a fluid velocity where the capsule velocity is equal to the fluid velocity (termed "equal velocity", $V_e$), micro-lift begins to occur.

Table 3 lists the liftoff velocity 80, $V_1$, corresponding to a condition of macro-lift, the equal velocity, $V_e$, corresponding to the inception of micro-lift, and calculated values of C.

TABLE 3
Lift-off velocity and equal velocity of capsules

| Capsule no. | Eccentricity E | Density distribution | Lift-off velocity $V_L$ (m/s) | Equal velocity $V_E$ (m/s) | Constant C in eqn. (12) |
|---|---|---|---|---|---|
| 1 | 0 | Uniform | 1.7 | 0.5 | 6.8 |
| 2 | +0.024 | Rear-heavy | 1.4 | 0.5 | 5.6 |
| 3 | −0.024 | Front-heavy | 2.1 | 0.5 | 8.4 |
| 4 | 0 | Uniform | 2.1 | 0.7 | 7.7 |
| 5 | +0.009 | Rear-heavy | 2.0 | 0.3 | 7.3 |
| 6 | −0.009 | Front-heavy | 2.1 | 0.5 | 7.7 |
| 7 | 0 | Uniform | 1.9 | 0.7 | 6.3 |
| 8 | +0.019 | Rear-heavy | 1.1 | 0.7 | 3.7 |
| 9 | −0.019 | Front-heavy | 2.2 | 0.6 | 7.3 |
| 10 | 0 | Uniform | 1.0 | 0.4 | 6.1 |
| 11 | +0.039 | Rear-heavy | — | 0 | — |
| 12 | −0.039 | Front-heavy | — | 0 | — |

As is evident from Tables 2 and 3, dynamic stability may generally be characterized by the static stability index I. Furthermore, the experimental data suggests that dynamic instability for capsules which are statically stable (I less than or equal to 1.0) only occurs at fluid velocities which exceed the liftoff velocity 80, $V_1$, characteristic of the macro-lift condition.

Thus, for coal logs 34, which are fabricated as statically stable capsules (i.e., $I1 < 1$), and carried through a coal log pipeline system 10, dynamic instability will be minimized if the bulk velocity, $V_b$, of the water 15 does not exceed twice the liftoff velocity 80. Further, headloss and abrasion to both the coal log 34 and the pipeline 16 may be minimized if the bulk velocity is maintained higher than the "equal velocity", characteristic of micro-lift conditions.

As previously indicated, the liftoff velocity 80, $V_1$, of a cylindrical capsule of uniform density is a function of C, S, k, g, a, and D, where the constant C is approximately 7.2. To determine how C varies for changes in eccentricity E, the values of C corresponding to the ten stable capsules reference in Table 3, which when correlated, provide following emperical correlation:

$C' = (1 - 10 E) C$ $C'$ = Non-Uniform Capsule Density Constant
E = eccentricity (previously defined)

Thus, the operating parameters of a coal log pipeline system 10 in which the coal logs 34 (having statically stable properties) are maintained in a stable flow orientation can generally be identified with the use of equations for $V_1$ and $C'$.

Hydrodynamic tests of the invention were undertaken to confirm the applicability of both the capsule lift-off velocity, $V_1$, and stability theories to the operation of a coal log pipeline 10. Further, tests were conducted to determine: (1) headloss versus bulk flow velocity, $V_b$, of a coal log pipeline; (2) the liftoff velocity 80 of coal logs 34; (3) extent of abrasion experienced by coal logs 34 carried through a pipeline 10; and (4) identification of problems associated with pipeline system 10 start-up and flow of coal logs 34 around bends.

As shown in FIG. 9, the test pipeline 190 comprised a closed-loop pipe 192 having a test section 194, a first bend 196, a straight section 197, and a second bend 198. The test pipeline 190 length was approximately 75 feet and the radius of curvature of the bend 196 and the second bend 198 was about 3.75 feet. Installed in the straight section 197 was a reservoir 199, a jet pump 200, a temperature maintenance system 202, and a transparent section 204. A laser-photocell device 208 for velocity measurement of coal logs 210 was installed at the upstream-most end of the test section 194. Installed along the distance of the test section 194 were acoustic flow meters 212 for measuring the mean flow velocity of the water 214. A pair of electromikes 216 were installed on the pipeline 190 in the vicinity of the transparent section 204 for measurement of clearance between coal logs 210 and a pipe floor 220 comprising the lowermost portion of the interior of the test pipeline 190.

The reservoir 199 provided a water supply and surge capacity for the system. The jet pump system 200 was of standard commercial design and allowed the water 214 to be pumped through the test pipeline 190 without the need for the coal logs 210 to physically pass through the pump 201. The temperature maintenance system 202 comprised a heat exchanger 225, a reservoir 226 and a pump 227. The purpose of the temperature maintenance 202 was to maintain the temperature of the water 214 constant throughout the experimentation. At the downstream-most portion of the straight section 197 was a transparent section 204 which allowed for visual observation of the water 214 and coal logs 210.

Individual experiments were conducted with coal logs 210 having diameters of 1.25 inches, 1.50 inches, and 1.75 inches. The value of k was 0.63, 0.70, and 0.84, respectively. The aspect ratio, a, (i.e., the length-to-diameter ratio) of the coal logs 210 were all 4.0. Each experiment was conducted with approximately 15 coal logs 210 flowing through the test pipeline 190. Headloss calculations were measured by pressure transducers 229 located along the length of the test section 194. The coal logs 210 were wrapped with aluminum foil to allow their position to be detected by the electromikes 216.

Figure 10:
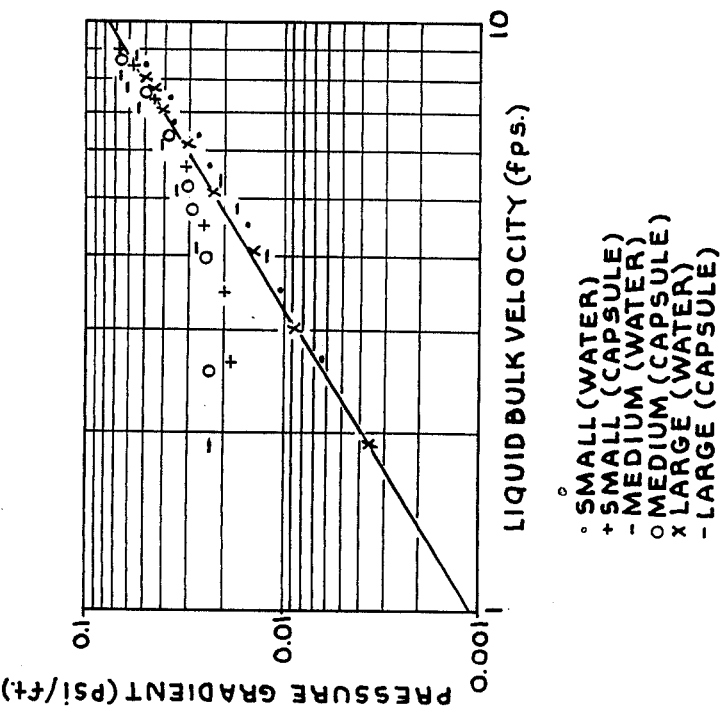
FIG. 10 is the theoretical relationship between the liquid bulk velocity and the associated pressure gradient of a coal log flowing through a pipeline.

FIG. 10 is a typical set of data taken for pressure gradient of the water 214 flow through the test section 194. The straight line on the log log plot represents the data for the pressure gradient along a test section without capsules present in the test section 194. Comparing the pressure gradients with and without coal logs 210 in the test section 194 show that at relatively low velocities of water 214, the pressure gradient of the system having coal logs 210 are much higher than for the flow of water 214 only. However, as the velocity of flow exceeded approximately 6 feet per second, the coal log 210 pressure gradient approached that of water 214 only. Thus, an unexpected feature of the invention is that a system operated at or above 6 feet per second velocities requires about the same energy as that required for pumping water only at the same speed.

Figure 11:
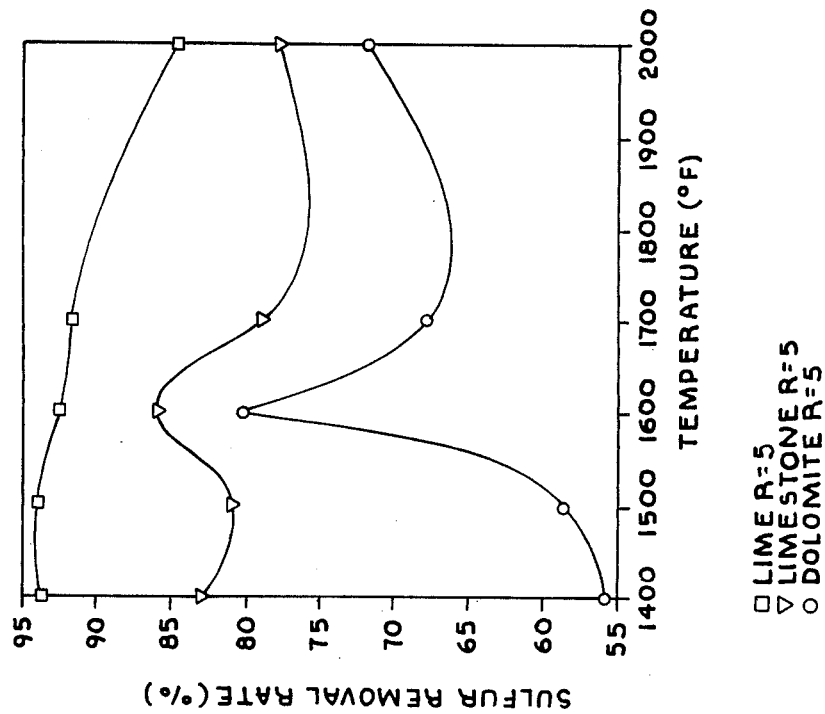
FIG. 11 is the theoretical relationship between the liquid bulk velocity and the gap between a coal log and the interior surfaces of the pipeline.
Figure 12:
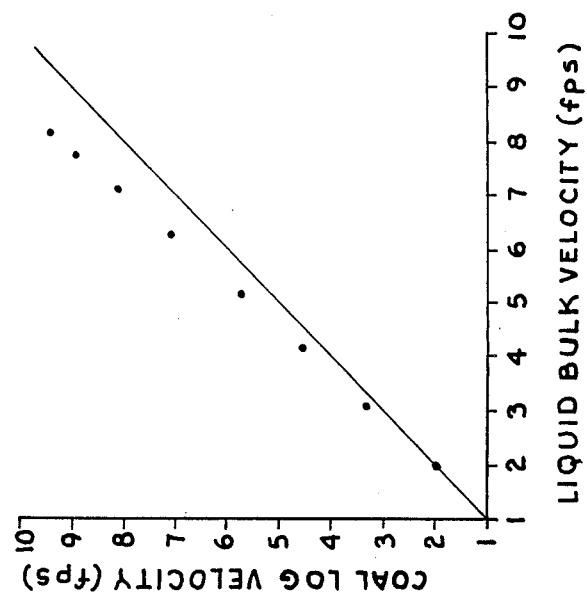
FIG. 12 is the theoretical relationship between the liquid bulk velocity and the coal log velocity carried through a pipeline.
Figure 11:
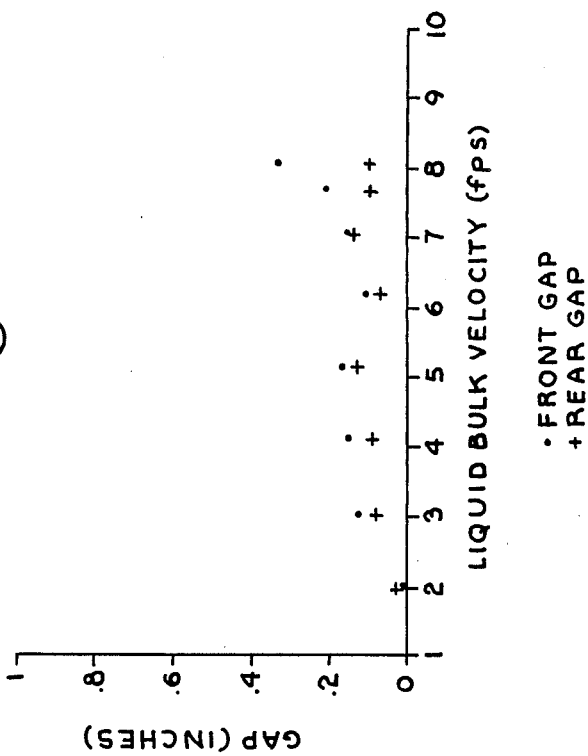

FIGS. 11 and 12 are typical plots of data pertaining to capsule lift-off liquid bulk velocity and capsule versus liquid bulk velocity, respectively. The coal logs 210 of the dimensions specified developed a gap at a bulk velocity of approximately 3 feet per second indicating the inception of micro-lift. A larger gap developed at a liquid bulk velocity, $V_b$, of approximately 8 feet per second indicated macro-lift. FIG. 12 shows that the coal log velocity exceeded the water bulk velocity between the water bulk velocities of 2 feet per second and 3 feet per second, indicating a condition of micro-lift.

It was also discovered that at water bulk velocities greater than 6 feet per second, the coal logs 210 would undergo substantial damage due to banging on the walls of the pipe as the logs 210 pass through the jet pump system 200.

It was discovered that the flow of coal logs 210 and water 214 could restart easily after stoppage of flow. The fluid velocity required to restart the motion was always smaller than 1.2 feet per second.

Thus, no restart problem is expected in the preferred embodiment of this invention, even in places where slurry pipelines may experience settling due to vertical curvature (saddle points), because each cross-section of the pipeline is occupied by only one coal log 34. Water cannot pass around the coal logs 34 without inducing a drag force and causing the coals 34 to move with water 45.

Experiments were also conducted on extrusion of coal 32 crushed into coal logs 34. A commercial extruder rated at 1.5 horsepower with a variable speed motor was used to extrude bituminous type coal. Various binders were used to make coal logs and included wax, lignosol, plasticrude, asphalt, coal-tar pitch and petrolatum 553.

Compressive strength tests and water absorption tests were conducted on coal logs produced with the different binders.

Figure 13:
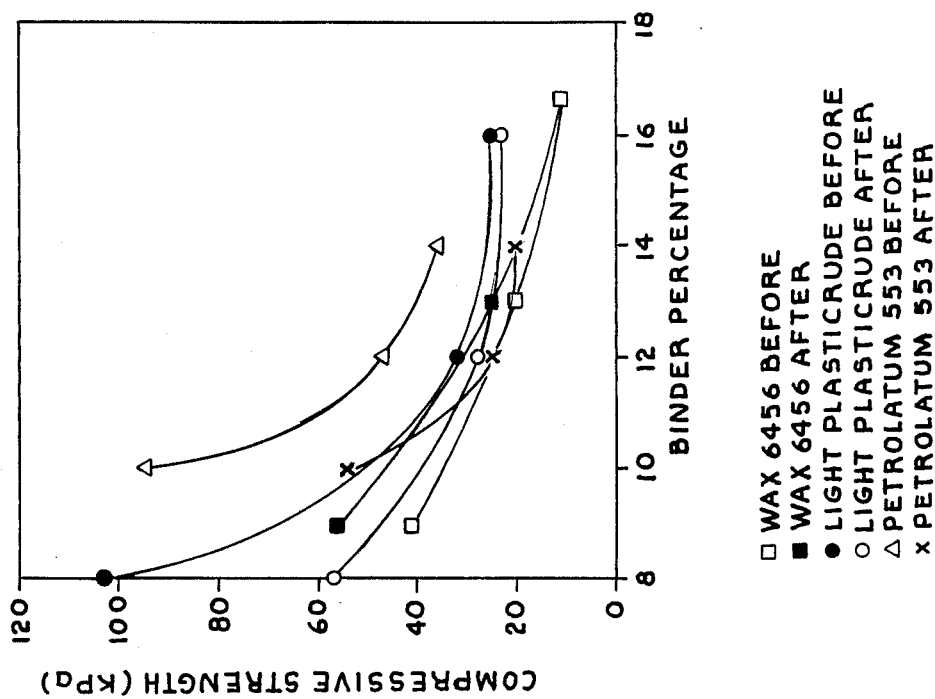
FIG. 13 is the theoretical relationship between the coal log binder percentage and compressive strength.
Figure 14:
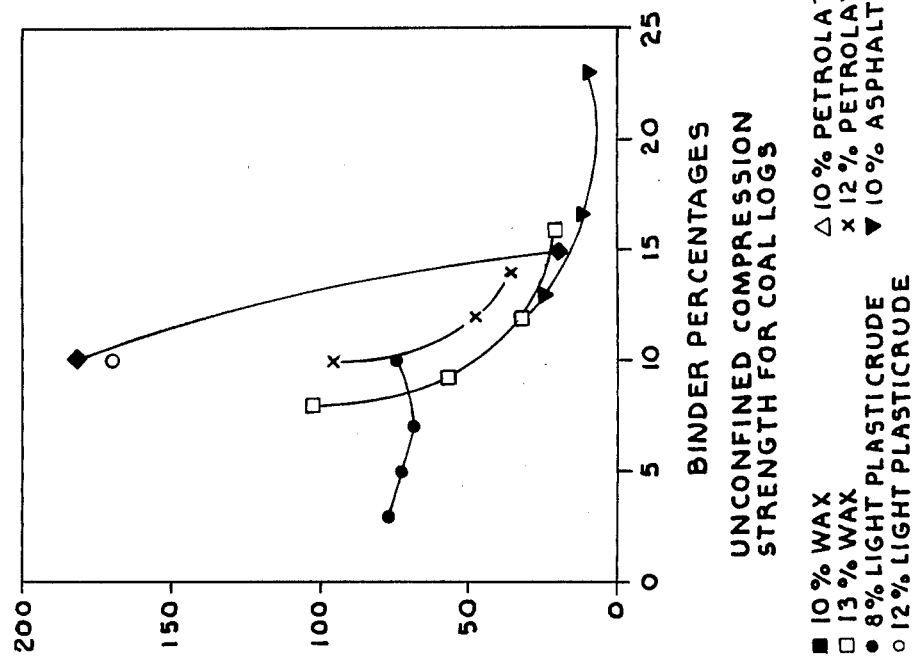
FIG. 14 is the theoretical relationship between the percentage of binder in a coal log and the unconfined compressive strength of the coal logs.

Coal logs with both ends flattened and smoothed were subjected to axial load (compression). The load was gradually increased until the log broke or was squashed, at which point the data was recorded for the calculation of compressive strength. FIGS. 13 and 14 are sets of results developed.

A general trend observed was that increasing the percentage of any binder had the effect of weakening the coal log. However, increasing the binder percentage eased the passage of the mixture through the extruder.

Figure 16:
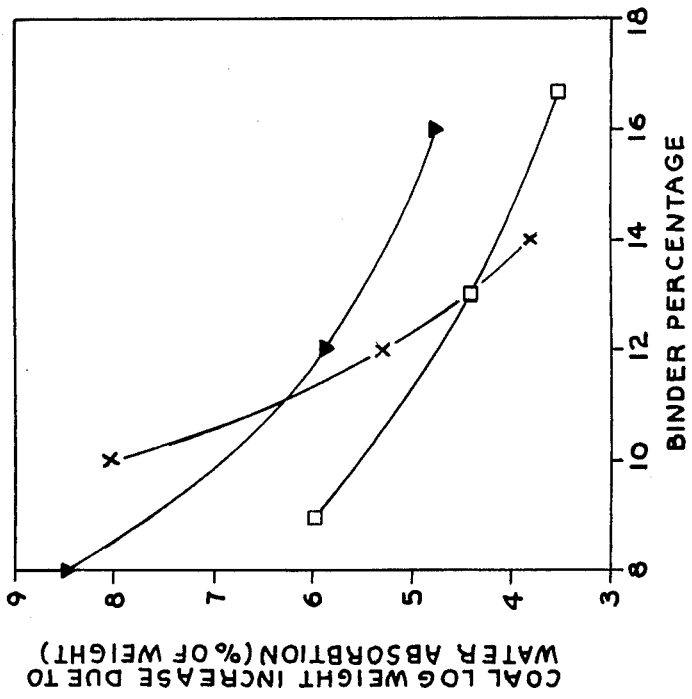
FIG. 16 is the theoretical relationship between the percentage of various binders present in a coal log and the percent of water absorbed by a coal log present in water.
Figure 15:
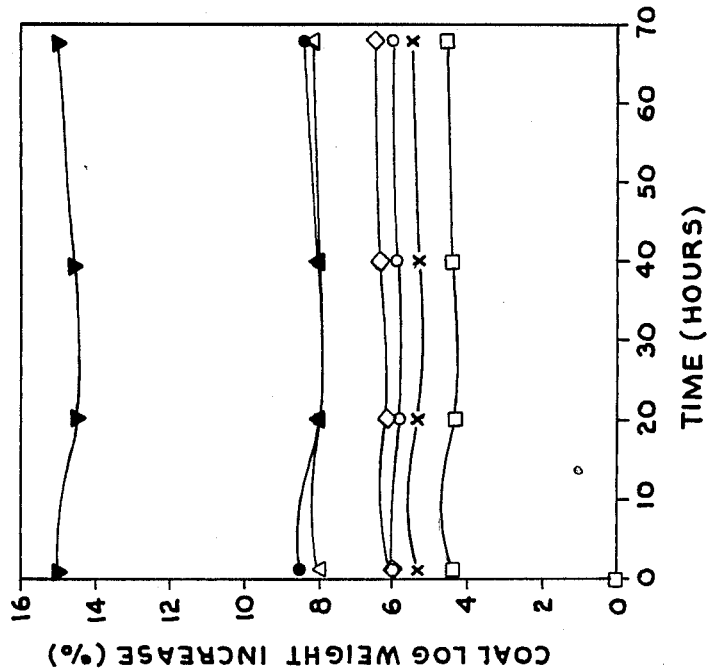
FIG. 15 is the theoretical relationship between the time a log is soaked in water versus the absorption of water by the coal log measured in weight percent increase of coal log.

Coal logs having various binders were tested for water absorption by submersing the individual logs in water. Fig. 15 is a typical set of data for coal log water absorption as a function of time. Most of the water was absorbed during the first hour during these experiments. FIG. 16 shows the maximum amount of water absorption in the coal logs as a function of the amount of binder used. The results show that the water absorption is inversely proportional to the percentage of binder used. It is theorized that the relationship of binder to water absorption is due to the variation of the empty space available (porosity) in the coal logs which receive and hold water.

Combustion tests were also performed on the coal logs. Limestone, hydrated lime, dolomite were tested for respective efficiencies in removing sulfur from the coal. The data is presented in FIG. 17 and indicates that all three materials are effective in capturing sulfur from coal. Also, the temperature of 1600 degrees F. was identified to be the furnace operating temperature at which the sulfur sorption was most efficient.

It is to be understood that while certain forms of the present invention have been illustrated and described herein, it is not to be limited to the specific forms or arrangement of parts described and shown.

What is claimed and desired to be secured by Letters Patent is as follows:

1. A method of transporting coal in a conduit, which comprises the steps of:
   (a) forming a solid body of coal;
   (b) placing said body of said coal in said conduit;
   (c) causing a carrier fluid to flow in said conduit at a bulk velocity, $V_b$, for coal being less than or equal to 2 times the lift-off velocity, $V_l$; and
   (d) removing said body of coal from said conduit.

2. The method of claim 1, wherein said conduit comprises a pipeline having a substantially uniform internal diameter.

3. The method of claim 2, including the step of crushing said coal prior to forming said body.

4. The method of claim 3, which includes the additional step of:
   (a) forming said body from said crushed coal generally into a cylindrical-shaped coal log, an outside diameter of said coal log being less than an inside diameter of said pipeline.

5. The method of claim 4, which includes the additional step of forming said coal log with an outside diameter generally less than 0.95 times the inner diameter of said pipeline but generally greater than 0.5 times the internal diameter of said pipeline.

6. The method of claim 5, which includes the additional step of:
   (a) forming said coal log wherein a stability index, I, is less than or equal to 1, where:
   $I = E/\bot 1-(1/S)\bot$
   E (eccentricy of coal log) $= 2x/L_c$
   where:
     x = distance between coal log center of gravity and coal log centroid;
     $L_c$ = longitudinal length of coal log; and
     S = specific gravity of coal log relative to said fluid carrier.

7. The method according to claim 6, which includes the additional step of:
   (a) forming said coal log with a longitudinal length between one and ten times the pipeline internal diameter.

8. The method of claim 6, which includes the additional step of:
   (a) forming said coal logs by mixing a coal binder into said crushed coal and extruding said crushed coal and binder into said coal logs.

9. The method according to claim 8, wherein said binder comprises a water-insoluble, combustible and non-toxic material which possesses a coal binding property.

10. The method according to claim 8, including the additional step of:
    (a) mixing a sulfur sorption agent into said crushed coal for extruding into said coal logs.

11. The method according to claim 10, wherein said sulfur sorption agent comprises limestone, hydrated lime, dolomite in any combination thereof.

12. The method of claim 4, including the step of:
    (a) placing said coal log in said pipeline by injecting said coal logs into said pipeline through a multi-tube launcher having tubes of sufficient length to contain a plurality of said coal logs therein.

13. The method according to claim 4, including the step of removing said coal log by ejecting said coal capsule from said pipeline employing a commercially suitable ejection means.

14. The method according to claim 1, where:
    $V_1 = C(|S-1|gak(1-K^2)D)^{**\frac{1}{2}}$; wherein:
    $V_1$ = liftoff velocity
    C = (1-10E) 7.2 (a constant which is a function of the eccentricity and geometry of the capsule and pipeline);
    $E = 2x/L_c$ x = distance between coal log center of gravity and coal log centroid (i.e., coal geometric center);
$L_c$ = longitudinal length of the coal log
S = capsule specific gravity;
g = acceleration of gravity;
a = longitudinal length of the capsule divided by the its diameter;
k = the ratio of the diameter of the capsule to the inner diameter of the pipeline; and
D = the inner diameter of the pipeline.

15. A method of transporting coal in a pipeline which comprises the steps of:
(a) forming a coal log generally having a cylindrical shape and a diameter greater than 0.5 times an internal diameter of said pipeline in less than 0.95 times an internal diameter of said pipeline;
(b) forming said coal log by extruding crushed coal into said cylindrical shape; extruding said crushed coal into said coal log having a stability index, I, less than or equal to 1, where:

$$I = |E|/|1-(1/S)|$$

E (eccentricity of coal log) = $2x/L_c$
where:
x = distance between coal log center of gravity and coal log centroid—i.e., coal log geometric center);
$L_c$ = longitudinal length of coal log; and
S = specific gravity of coal log relative to said fluid carrier;
(c) extruding said crushed coal into coal logs having a longitudinal length greater than one times the internal diameters of said pipeline but less than ten times the internal diameter of said pipeline;
(d) mixing a water-insoluble, combustible and non-toxic coal binder and a sulfur sorption agent into said crushed coal prior to extruding said crushed coal into said coal logs; wherein said sulfur sorption agent comprises limestone, hydrated lime, dolomite and any combination thereof;
(e) injecting said coal logs into said pipeline;
(f) causing a carrier fluid to flow in said pipeline at a bulk velocity, $V_b$, less than twice the lift-off velocity, $V_1$ where:
$V_1 = C(|S-1|gak(1-k^2)D)^{**\frac{1}{2}}$; wherein:
$V_1$ = liftoff velocity 80
C = (1−10E) 7.2 (a constant which is a function of the eccentricity and geometry of the capsule and pipeline);
E = $2x/L_c$
x = distance between coal log center of gravity and coal log centroid (i.e., coal geometric center);
$L_c$ = longitudinal length of the coal log;
S = capsule specific gravity;
g = acceleration of gravity;
a = longitudinal length of the capsule divided by the its diameter;
k = the ratio of the diameter of the capsule to the inner diameter of the pipeline; and
D = the inner diameter of the pipeline
(g) ejecting said coal logs from said pipeline at a desired location using a suitable ejection means.

16. An apparatus for transporting coal through a pipeline, including:
(a) coal log fabrication means;
(b) pipeline means;
(c) fluid carrier means for carrying said coal logs through said pipeline means;
(d) coal log injection means for injection of said fabricated coal logs in said pipeline means; said injection means comprising a plurality of launcher tubes having an integral diameter identical to the diameter of the pipeline, each launcher tube having a first end and a second end; said coal log fabrication means in flow communication with said first end of each said launcher tube, said second end of said launcher tube fixedly attached and in flow communication with said pipeline means; a check valve means positioned in said launcher tube for preventing back-flow of said pipeline into said launcher tube; full-bore valve means positioned in the proximity of the second end of each said launcher tube to allow for passage of said coal logs through said full-bore valve means when full-bore valve means is positioned to open and for flow isolating said launcher tube from said pipeline when said full-bore valve is positioned shut;
(e) a pump means and fluid supply header in flow communication with each launcher tube; and
(f) wherein said coal logs are alternately fed into and emptied from said launcher tubes by alternately opening and closing said full-bore valves.

17. An apparatus for transporting coal through a pipeline, including:
(a) coal log fabrication means;
(b) a pipeline means;
(c) a fluid carrier means for carrying said coal logs through said pipeline means;
(d) a coal log injection means for injection of said fabricated coal logs in said pipeline means; and
(e) a fluid carrier pumping means; said fluid carrier means adapted for maintaining the bulk velocity of the carrier fluid at a velocity less than two times the lift-off velocity, $V_1$ of the coal log, where:
$V_1 = C(|S-1|gak(1-k^2)D)^{**\frac{1}{2}}$: wherein
$V_1$ = lift-off velocity;
S = lift-off velocity;
g = acceleration of gravity;
a = longitudinal length of the capsule divided by its diameter;
k = the ratio of the diameter of the capsule to the inner diameter of the pipeline;
D = the inner diameter of the pipeline 83.
C = (1−10 E) 7.2; where:
E = (eccentricity) = $2x/L_c$; where:
x = distance between coal log center of gravity and coal log centroid (i.e. the geometric coal log center);
$L_c$ = longitudinal length of coal log.

18. An apparatus for transporting coal through a pipeline, including:
(a) coal log fabrication means; said coal log fabrication means adapted for producing coal logs with a stability index, I, less than or equal to 1.0, where
$I = |E|/|1-(1/S)$;
E = coal log eccentricity = $2x/L_c$; where
x = distance between coal log center of gravity and coal log centroid (i.e. the geometric coal log center);
$L_c$ = longitudinal length of coal log.
S = coal log specific gravity;
(b) a pipeline means;
(c) a fluid carrier means for carrying said coal logs through said pipeline means;

(d) a coal log injection means for injection of said fabricated coal logs in said pipeline means; and (e) a fluid carrier pumping means.

19. An apparatus for transporting coal through a pipeline, including:

(a) a pipeline means which comprises a pipeline having a substantially uniform internal diameter;

(b) a coal log fabrication means comprising a standard commercial extruder of a design capable of extruding crushed coal into cylindrical shaped coal logs having an outside diameter less than 0.95 times the inner diameter of said pipeline means but greater than 0.5 times the internal diameter of said pipeline means; said extruder capable of extruding said crushed coal mixed with a coal binder and a sulfur absorption agent; the length of said coal log being greater than 1 times the internal diameter of said pipeline means less than 10 times the internal diameter of said pipeline means; wherein said extruder is capable for forming said coal having a stability index, I, less than or equal to 1, where $I = -|E|/|1-1/S|$;

(c) a fluid carrier means for carrying said coal logs through said pipeline means;

(d) a coal log injection means for injection of said fabricated coal logs in said pipeline means; said injection means comprising a plurality of launcher tubes having an internal diameter identical to the diameter of the pipeline means, each launcher tube having a first end and a second end; a coal log fabrication means in flow communication with said first end of said launcher tube, said second end of said launcher tube fixedly attached in flow communication with said pipeline means; a check valve means positioned in said launcher tube for preventing back-flow from said pipeline into said launcher tube; full-bore valve means positioned in the proximity of the second end of each said launcher tube to allow for passage of said coal logs through said full-bore valve means when full-bore valve means is positioned open and for flow isolating said launcher tube from said pipeline when said full-bore valve is positioned shut; a pump means and fluid supply header in flow communication with each said launcher tube; wherein said coal logs are alternately fed into and emptied from said launcher tube by alternately opening and closing said full-bore valves;

(d) a coal log injection means for injection of said fabricated coal logs in said pipeline means; said ejection means comprising a conveyor means located adjacent to and in flow communication with an outlet of said pipeline for receiving said coal logs, dewatering said coal logs, and for transferring said coal logs to a desired location for processing;

(e) a fluid carrier pumping means; said pumping means comprising a pump suitable for maintaining the bulk velocity of the carrier fluid at a velocity less than two times the lift-off velocity, $V_1$ of the coal log, where:

$V_1 = C(|S-1|gak(1-k^2)D)^{**\frac{1}{2}}$: wherein $V_1$ = lift-off velocity;

S = capsule specific gravity;

g = acceleration of gravity;

a = longitudinal length of the capsule divided by the its diameter;

k = the ratio of the diameter of the capsule to the inner diameter of the pipeline; and D = the inner diameter of the pipeline 83.

$C = (1-10E)7.2$ where:

E (eccentricity) = $2x/L_c$; where:

x = distance between coal log center of gravity and coal log centroid (i.e. the geometric coal log center);

$L_c$ = longitudinal length of coal log.

* * * * *

UNITED STATES PATENT AND TRADEMARK OFFICE
CERTIFICATE OF CORRECTION

PATENT NO. : 4,946,317

DATED : August 7, 1990

INVENTOR(S) : Henry Liu et al.

It is certified that error appears in the above-identified patent and that said Letters Patent is hereby corrected as shown below:

Column 1, line 6, please insert the following information:

"This Invention was made with government support under Grant No. DE-FG22-86PC90517, Grant No. DE-FG01-90CE15466, and Grant No. DE-FC22-93PC92578 awarded by the Department of Energy. The government has certain rights in the Invention."

Signed and Sealed this

Twentieth Day of February, 1996

Attest:

BRUCE LEHMAN

Attesting Officer    Commissioner of Patents and Trademarks